US012598359B2

(12) United States Patent
Choi et al.

(10) Patent No.: US 12,598,359 B2
(45) Date of Patent: Apr. 7, 2026

(54) DISPLAY DEVICE

(71) Applicant: LG ELECTRONICS INC., Seoul (KR)

(72) Inventors: Woojin Choi, Seoul (KR); Changhoe Kim, Seoul (KR); Jihoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/845,335

(22) PCT Filed: Apr. 13, 2022

(86) PCT No.: PCT/KR2022/005341
§ 371 (c)(1),
(2) Date: Sep. 9, 2024

(87) PCT Pub. No.: WO2023/200026
PCT Pub. Date: Oct. 19, 2023

(65) Prior Publication Data
US 2025/0184575 A1      Jun. 5, 2025

(51) Int. Cl.
*H04N 21/488* (2011.01)
*H04N 21/422* (2011.01)
*H04N 21/439* (2011.01)
(52) U.S. Cl.
CPC ..... *H04N 21/488* (2013.01); *H04N 21/42203* (2013.01); *H04N 21/4394* (2013.01)

(58) Field of Classification Search
CPC ........... H04N 21/488; H04N 21/42203; H04N 21/4394; H04N 21/43615; H04N 21/422;
(Continued)

(56) References Cited

U.S. PATENT DOCUMENTS

| | | | | |
|---|---|---|---|---|
| 9,854,084 | B2 * | 12/2017 | Chang | ............... H04M 1/72403 |
| 2011/0030021 | A1 * | 2/2011 | Campagna | ....... H04N 21/42203 |
| | | | | 725/117 |

(Continued)

FOREIGN PATENT DOCUMENTS

| | | |
|---|---|---|
| KR | 10-0610486 B1 | 8/2006 |
| KR | 10-2014-0038613 A | 3/2014 |

(Continued)

OTHER PUBLICATIONS

International Search Report for PCT/KR2022/005341 mailed on Jan. 6, 2023.

*Primary Examiner* — John R Schnurr
(74) *Attorney, Agent, or Firm* — Birch, Stewart, Kolasch & Birch, LLP

(57) ABSTRACT
A display device according to an embodiment disclosed herein may include a controller for receiving an audio signal and determining whether the received audio signal is an alarm signal. A display device according to an embodiment disclosed herein may include: a microphone for receiving an audio signal; a controller for determining whether the audio signal is an alarm signal; and a speaker for outputting a signal corresponding to the alarm signal. A display device according to an embodiment disclosed herein may include a display for outputting a signal corresponding to an alarm signal.

14 Claims, 9 Drawing Sheets

(58) Field of Classification Search
CPC ............. H04N 21/436; H04N 21/4363; H04N
21/485; H04N 21/4882; G06K 19/06
See application file for complete search history.

(56) References Cited

U.S. PATENT DOCUMENTS

| 2012/0151536 | A1 * | 6/2012 | Park ..................... H04N 21/436 |
| | | | 725/80 |
| 2014/0341408 | A1 * | 11/2014 | Varghese ............. H04R 25/554 |
| | | | 381/315 |
| 2015/0172585 | A1 * | 6/2015 | Park ......................... H04N 5/63 |
| | | | 348/730 |
| 2015/0201275 | A1 * | 7/2015 | Lee ..................... H04R 1/1041 |
| | | | 381/74 |
| 2016/0100379 | A1 * | 4/2016 | Nguyen ............ H04M 1/72412 |
| | | | 455/458 |
| 2016/0328949 | A1 | 11/2016 | Zhong |
| 2019/0228766 | A1 * | 7/2019 | White ................ G06Q 10/1093 |
| 2020/0336851 | A1 | 10/2020 | Iswanto et al. |
| 2022/0408136 | A1 * | 12/2022 | Wang ................... H04N 21/439 |
| 2023/0350629 | A1 * | 11/2023 | Wang .............. H04N 21/44227 |

FOREIGN PATENT DOCUMENTS

| KR | 10-2015-0104686 A | 9/2015 | |
| KR | 10-2017-0059813 A | 5/2017 | |
| KR | 10-1773173 B1 | 9/2017 | |
| KR | 20170115024 A * | 10/2017 | .......... H04N 21/435 |
| KR | 10-2022-0040587 A | 3/2022 | |
| WO | WO-2022198211 A1 * | 9/2022 | ........... H04L 51/224 |

* cited by examiner

FIG. 5

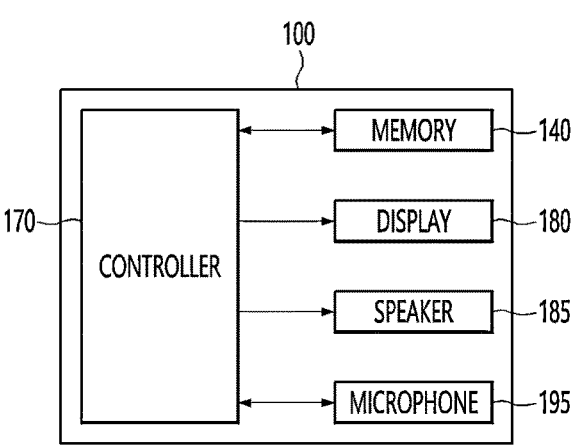

100

- MEMORY — 140
- DISPLAY — 180
- SPEAKER — 185
- MICROPHONE — 195

170 — CONTROLLER

FIG. 6

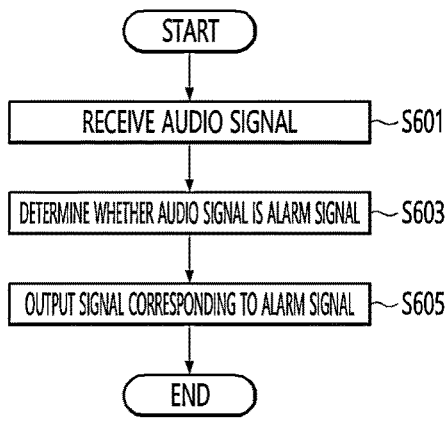

START

RECEIVE AUDIO SIGNAL — S601

DETERMINE WHETHER AUDIO SIGNAL IS ALARM SIGNAL — S603

OUTPUT SIGNAL CORRESPONDING TO ALARM SIGNAL — S605

END

FIG. 7

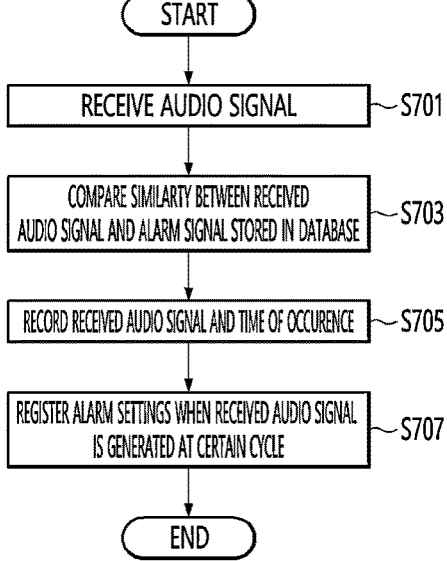

START

RECEIVE AUDIO SIGNAL — S701

COMPARE SIMILARTY BETWEEN RECEIVED AUDIO SIGNAL AND ALARM SIGNAL STORED IN DATABASE — S703

RECORD RECEIVED AUDIO SIGNAL AND TIME OF OCCURENCE — S705

REGISTER ALARM SETTINGS WHEN RECEIVED AUDIO SIGNAL IS GENERATED AT CERTAIN CYCLE — S707

END

FIG. 8

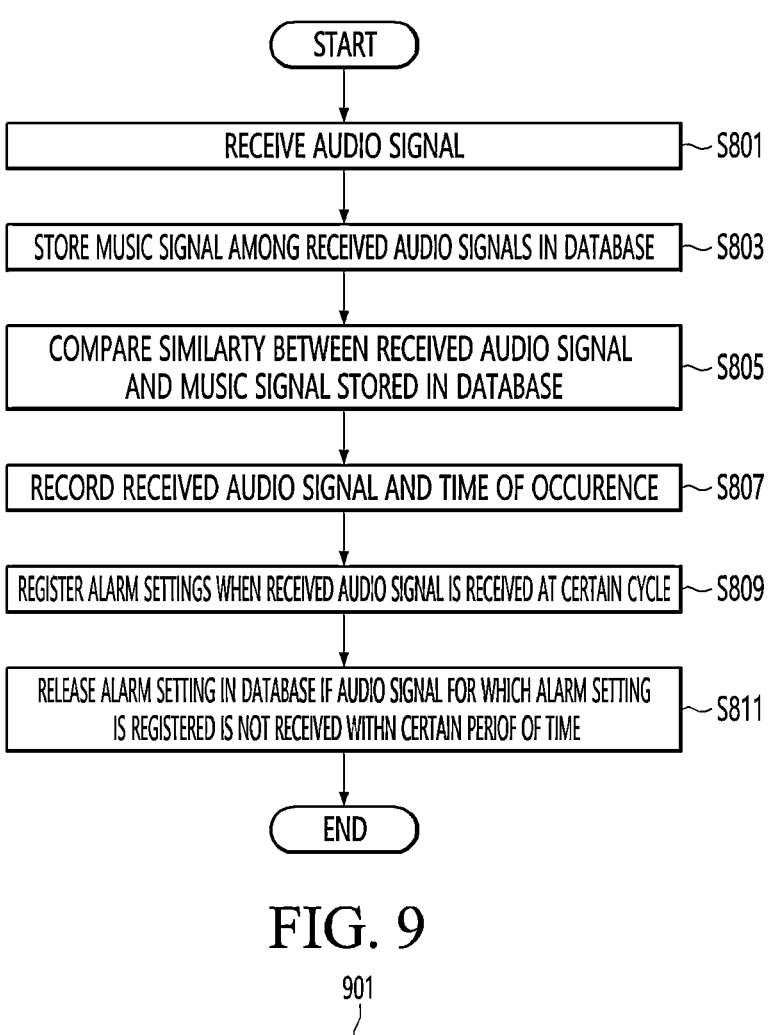

START

RECEIVE AUDIO SIGNAL ~ S801

STORE MUSIC SIGNAL AMONG RECEIVED AUDIO SIGNALS IN DATABASE ~ S803

COMPARE SIMILARTY BETWEEN RECEIVED AUDIO SIGNAL AND MUSIC SIGNAL STORED IN DATABASE ~ S805

RECORD RECEIVED AUDIO SIGNAL AND TIME OF OCCURENCE ~ S807

REGISTER ALARM SETTINGS WHEN RECEIVED AUDIO SIGNAL IS RECEIVED AT CERTAIN CYCLE ~ S809

RELEASE ALARM SETTING IN DATABASE IF AUDIO SIGNAL FOR WHICH ALARM SETTING IS REGISTERED IS NOT RECEIVED WITHN CERTAIN PERIOF OF TIME ~ S811

END

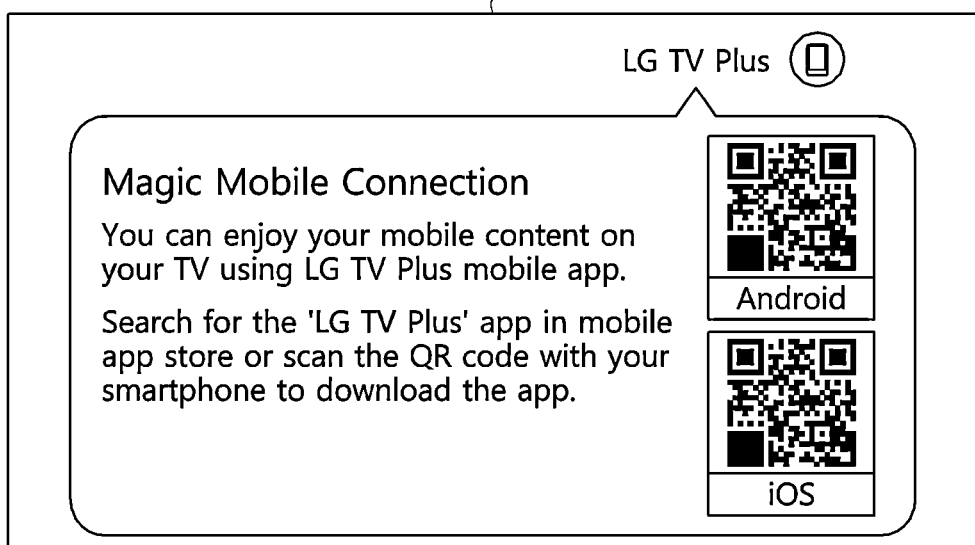

LG TV Plus

Magic Mobile Connection

You can enjoy your mobile content on your TV using LG TV Plus mobile app.

Search for the 'LG TV Plus' app in mobile app store or scan the QR code with your smartphone to download the app.

Android iOS

1001

DISPLAY DEVICE

CROSS REFERENCE TO RELATED APPLICATION

This application is the National Phase of PCT International Application No. PCT/KR2022/005341, filed on Apr. 13, 2022, which is hereby expressly incorporated by reference into the present application.

TECHNICAL FIELD

The present disclosure relates to a display device and a method for driving the same.

The present disclosure relates to a display device that may recognize an alarm signal generated from a peripheral device and provide an alarm function to a user, and a method for driving the same.

BACKGROUND ART

Users can save and manage schedules on mobile devices such as smartphones. Additionally, users often use the alarm setting function implemented in mobile terminals. When an alarm occurs, the mobile terminal outputs an alarm through a speaker or generates an alarm through vibration in response to the user's mode selection. However, the alarm function through the speaker or vibration motor of the mobile terminal has a small sound and is limited in the distance at which it can be transmitted to the user, so it does not perform a sufficient function as an alarm to the user.

Meanwhile, various studies are being attempted to provide new user experiences in display devices such as TVs.

DISCLOSURE

Technical Problem

The present disclosure provides a display device capable of recognizing alarm signals generated from peripheral devices and registering alarm settings, and a method for driving the same.

The present disclosure provides a display device that capable of recognizing an alarm signal generated from a peripheral device and providing an alarm function to a user, and a method for driving the same.

The present disclosure provides a display device capable of recognizing an alarm signal generated from a peripheral device and providing a control signal to the peripheral device, and a method for driving the same.

Technical Solution

A display device according to an embodiment of the present disclosure may include a controller that receives an audio signal and determines whether the received audio signal is an alarm signal.

A display device according to an embodiment of the present disclosure may include a controller that receives an audio signal, determines whether the received audio signal is an alarm signal, and registers alarm settings.

A display device according to an embodiment of the present disclosure may include a controller that recognizes an alarm signal generated from a peripheral device and registers alarm settings.

A display device according to an embodiment of the present disclosure may include a controller that recognizes an alarm signal generated from a peripheral device and provides an alarm function to the user.

A display device according to an embodiment of the present disclosure may include a controller that recognizes an alarm signal generated from a peripheral device and provides a control signal to the peripheral device.

A display device according to an embodiment of the present disclosure may include a microphone receiving an audio signal; a controller determining whether the audio signal is an alarm signal; and a speaker outputting a signal corresponding to the alarm signal.

A display device according to an embodiment of the present disclosure may further include a display outputting a signal corresponding to the alarm signal.

According to a display device according to an embodiment of the present disclosure, the audio signal received by the microphone may include a voice signal and a music signal, and the controller may determine whether the received music signal is an alarm signal.

According to a display device according to an embodiment of the present disclosure, the controller may extract a music signal from the received audio signal, and register the extracted music signal as an alarm signal when it is determined that the extracted music signal is received at a certain time or at a certain period.

According to a display device according to an embodiment of the present disclosure, the controller may extract a music signal from the received audio signal, and register the extracted music signal as an alarm signal, for the extracted music signal, when at least one of a similarity comparison value with a music signal stored in a database, a reception time coincidence comparison value, or a reception period comparison value satisfies set criteria.

According to a display device according to an embodiment of the present disclosure, a music signal that is not received again until a certain period of time has elapsed among the music signals registered as the alarm signals may be released from the registered alarm signal.

According to a display device according to an embodiment of the present disclosure, the audio signal may be generated from a device located around the microphone.

According to a display device according to an embodiment of the present disclosure, the controller may output an audio signal or a video signal to inquire whether to register an alarm when an alarm signal is recognized.

According to a display device according to an embodiment of the present disclosure, the controller may recognize a trigger signal added to an alarm signal among the audio signals and output a signal corresponding to the trigger signal.

According to a display device according to an embodiment of the present disclosure, the trigger signal may be connected to and added to an end portion of the alarm signal.

According to a display device according to an embodiment of the present disclosure, the controller may recognize the trigger signal and generate a control signal corresponding to the trigger signal to drive at least one of the speaker or the display.

According to a display device according to an embodiment of the present disclosure, the controller may recognize the trigger signal, generates a control signal corresponding to the trigger signal, and transmit the control signal to a peripheral device.

According to a display device according to an embodiment of the present disclosure, when an alarm signal is recognized, the controller may display a QR code or barcode on the display and provide a connection to a user device.

According to a display device according to an embodiment of the present disclosure, when an alarm signal is recognized, the controller may generate a control signal set corresponding to the recognized alarm signal and drive at least one of the speaker or the display.

According to a display device according to an embodiment of the present disclosure, when an alarm signal is recognized, the controller may transmit a control signal set corresponding to the recognized alarm signal to a peripheral device.

A method for driving a display device according to an embodiment of the present disclosure may receive an audio signal and determine whether the received audio signal is an alarm signal.

A method for driving a display device according to an embodiment of the present disclosure may receive an audio signal, determine whether the received audio signal is an alarm signal, and register alarm settings.

A method for driving a display device according to an embodiment of the present disclosure may recognize an alarm signal generated from a peripheral device and register alarm settings.

A method for driving a display device according to an embodiment of the present disclosure may recognize an alarm signal generated from a peripheral device and provide an alarm function to the user.

A method for driving a display device according to an embodiment of the present disclosure may recognize an alarm signal generated from a peripheral device and provide a control signal to the peripheral device.

Advantageous Effect

According to the display device and the method for driving the same according to various embodiments of the present disclosure, it is capable of recognizing an alarm signal generated from a peripheral device and registering an alarm setting.

According to the display device and the method for driving the same according to various embodiments of the present disclosure, it is capable of recognizing an alarm signal generated from a peripheral device and providing an alarm function to the user.

According to the display device and its driving method according to various embodiments of the present disclosure, it is capable of recognizing an alarm signal generated from a peripheral device and providing a control signal to the peripheral device.

DESCRIPTION OF DRAWINGS

FIG. 5 is a block diagram illustrating a display device according to an embodiment of the present disclosure.

FIG. 6 is a flowchart illustrating a method for driving a display device according to an embodiment of the present disclosure.

FIG. 7 is a flowchart illustrating another method for driving a display device according to an embodiment of the present disclosure.

FIG. 8 is a flowchart illustrating another method for driving a display device according to an embodiment of the present disclosure.

FIG. 9 is a view illustrating another method for driving a display device according to an embodiment of the present disclosure.

Figure 10:
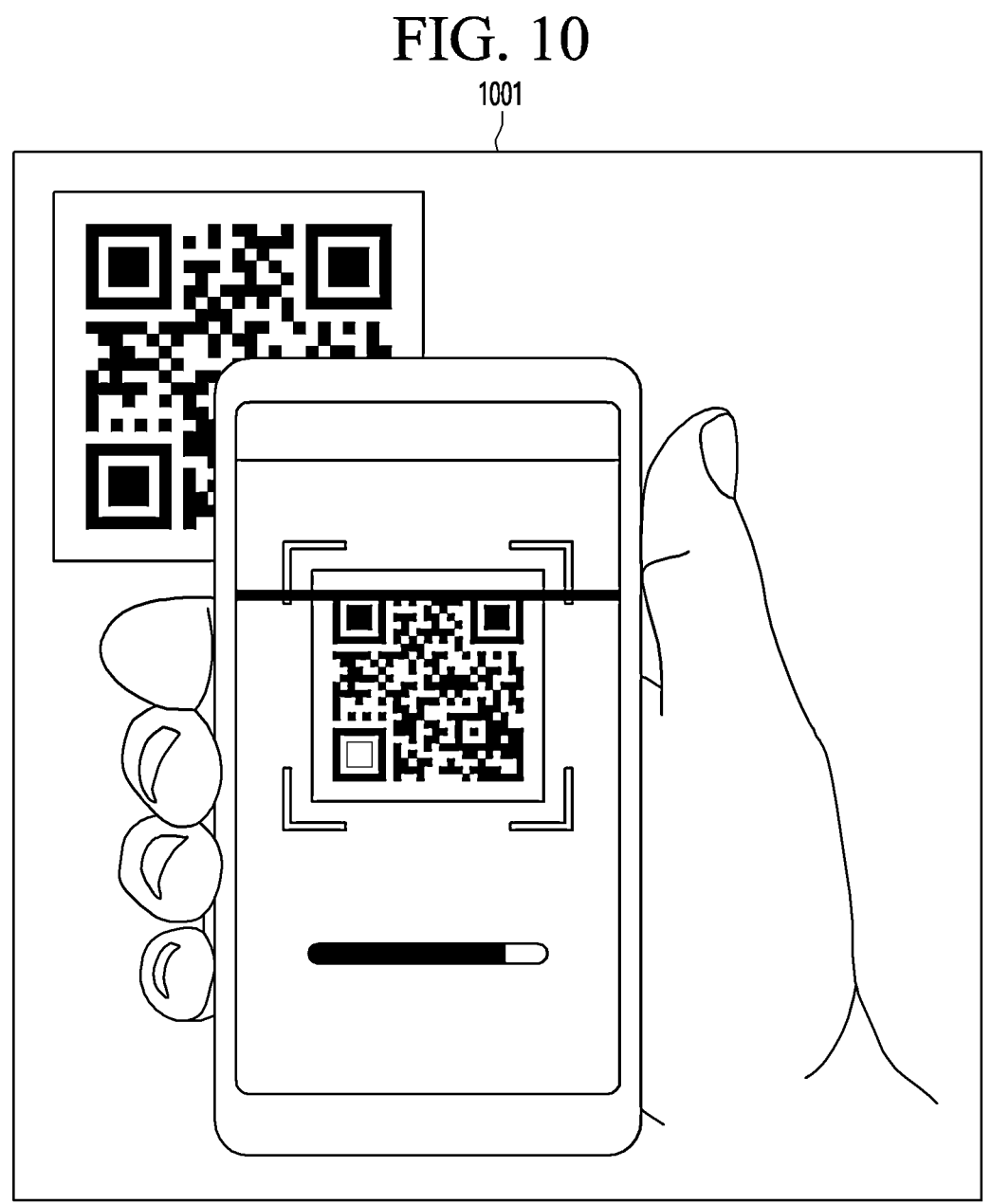

FIG. 10 is a view illustrating another method for driving a display device according to an embodiment of the present disclosure.

Figure 11:
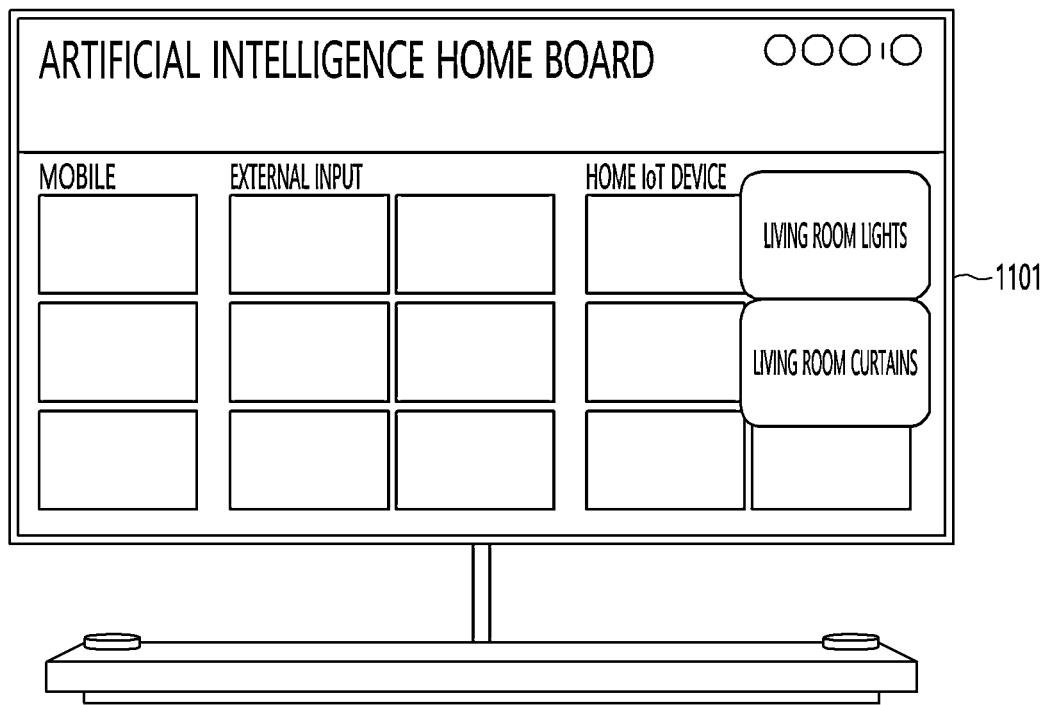

FIG. 11 is a view illustrating another method for driving a display device according to an embodiment of the present disclosure.

Figure 12:
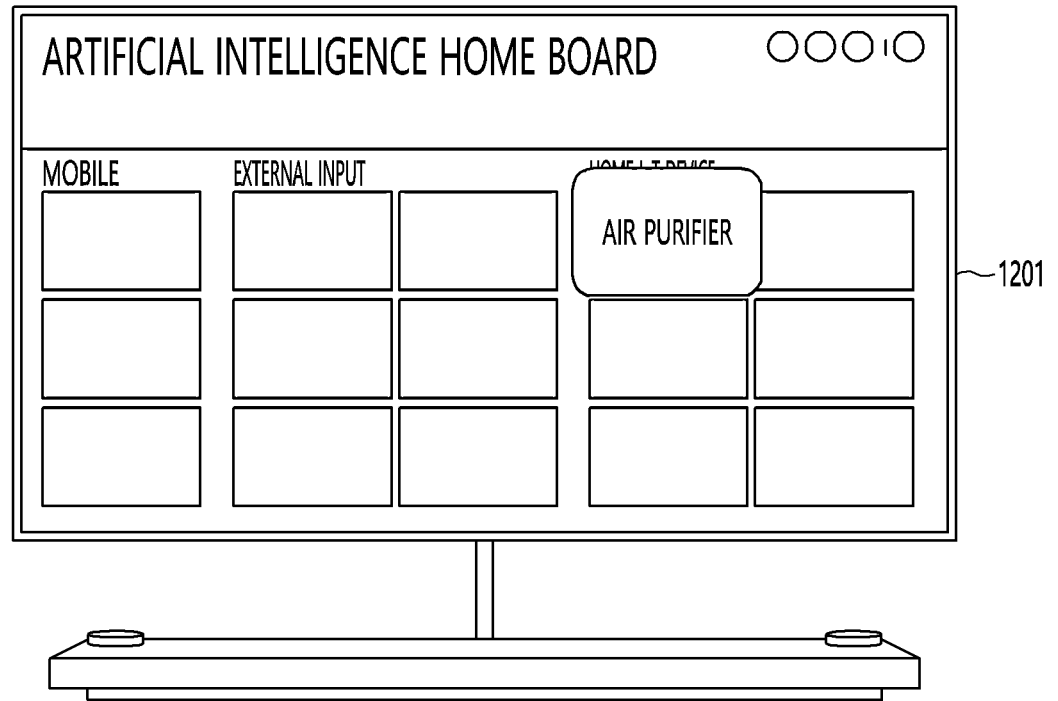

FIG. 12 is a view illustrating another method for driving a display device according to an embodiment of the present disclosure.

Figure 13:
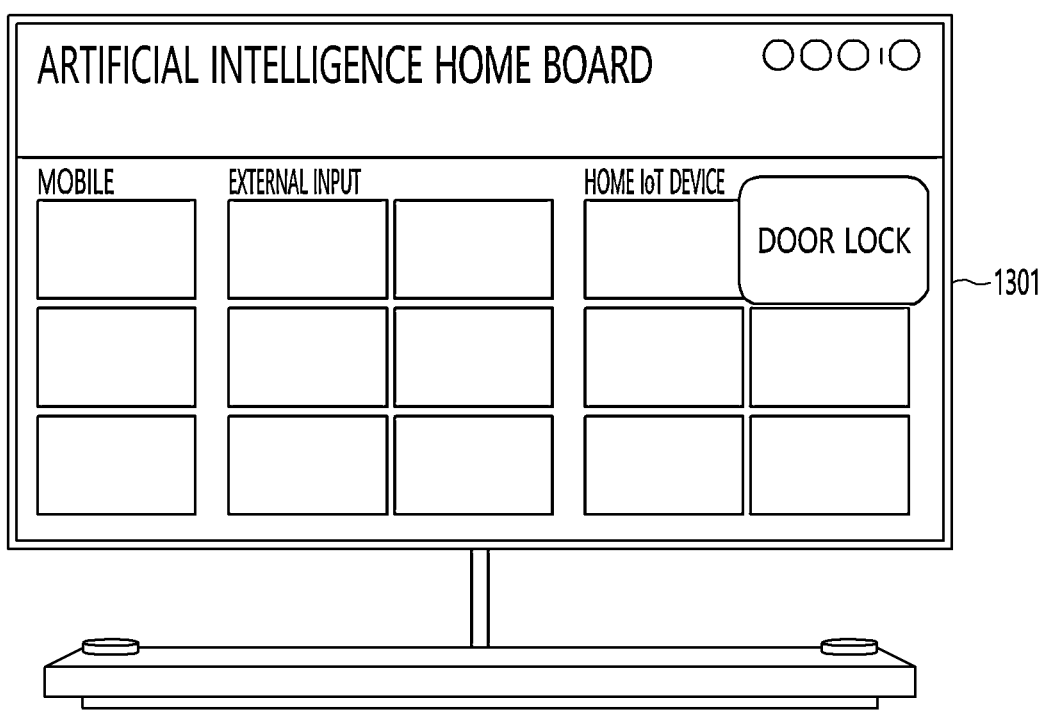

FIG. 13 is a view illustrating another method for driving a display device according to an embodiment of the present disclosure.

Figure 14:
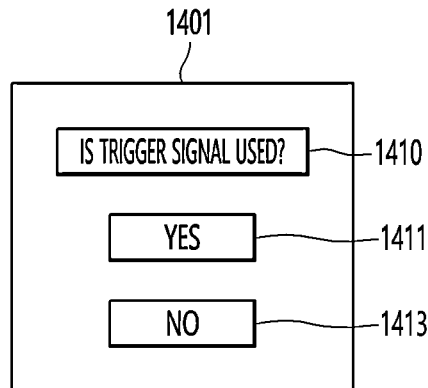

FIG. 14 is a view illustrating another method for driving a display device according to an embodiment of the present disclosure.

MODE FOR INVENTION

Hereinafter, embodiments relating to the present disclosure will be described in detail with reference to the accompanying drawings. The suffixes "interface", "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
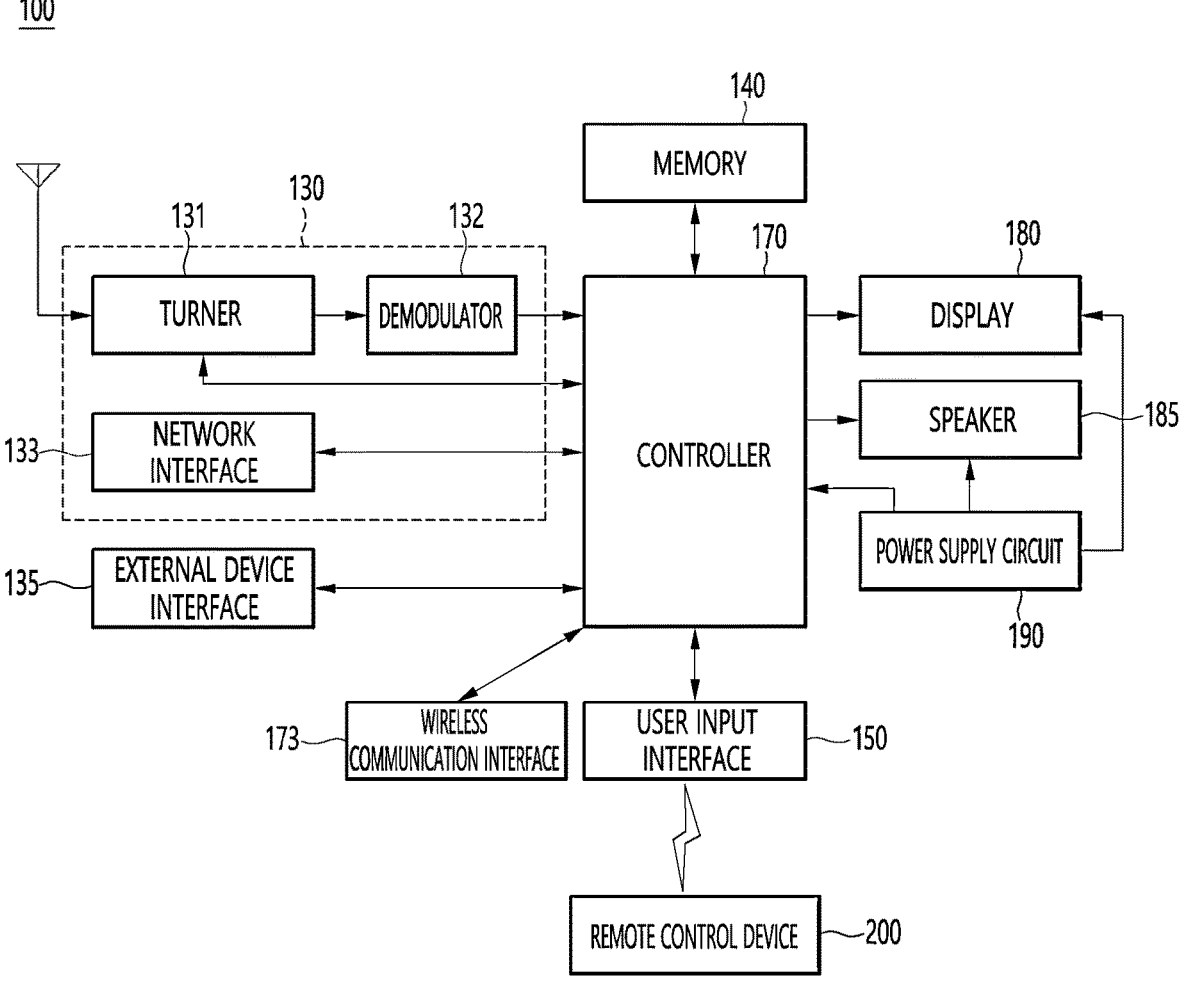
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception part 130, an external device interface 135, a memory 140, a user input interface 150, a controller 170, a wireless communication interface 173, a display 180, a speaker 185, and a power supply circuit 190.

The broadcast reception part 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into an output available form.

The external device interface 135 may receive an application or an application list in an adjacent external device and deliver the application or the application list to the controller 170 or the memory 140.

The external device interface 135 may provide a connection path between the display device 100 and an external device. The external device interface 135 may receive at least one of an image or an audio outputted from an external device that is wirelessly or wiredly connected to the display device 100 and deliver the received image or the audio to the controller. The external device interface 135 may include a plurality of external input terminals. The plurality of external input terminals may include an RGB terminal, at least one High Definition Multimedia Interface (HDMI) terminal, and a component terminal.

An image signal of an external device inputted through the external device interface 135 may be outputted through the display 180. A sound signal of an external device inputted through the external device interface 135 may be outputted through the speaker 185.

An external device connectable to the external device interface 135 may be one of a set-top box, a Blu-ray player, a DVD player, a game console, a sound bar, a smartphone, a PC, a USB Memory, and a home theater system but this is just exemplary.

The network interface 133 may provide an interface for connecting the display device 100 to a wired/wireless network comprising internet network. The network interface 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface 133 may access a predetermined webpage through an accessed network or another network linked to the accessed network. In other words, the network interface 133 may transmit or receive data to or from a corresponding server by accessing a predetermined webpage through the network.

The network interface 133 may receive content or data provided from a content provider or a network operator. In other words, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the air, through network.

The memory 140 may store signal-processed image, voice, or data signals stored by a program in order for each signal processing and control in the controller 170.

In addition, the memory 140 may perform a function for temporarily storing image, voice, or data signals output from the external device interface 135 or the network interface 133, and may store information on a predetermined image through a channel memory function.

The memory 140 may store an application or an application list input from the external device interface 135 or the network interface 133.

The display device 100 may play content files (for example, video files, still image files, music files, document files, application files, etc.) stored in the memory 140, and may provide the content files to a user.

The user input interface 150 may transmit signals input by a user to the controller 170, or may transmit signals from the controller 170 to a user. For example, the user input interface 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and Infrared (IR) communication methods.

In addition, the user input interface 150 may transmit, to the controller 170, control signals input from local keys (not illustrated) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the speaker 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input interface 150, and may access the network to download a desired application or application list into the display device 100.

The controller 170 may output channel information selected by a user together with the processed image or voice signals through the display 180 or the speaker 185.

In addition, the controller 170 may output image signals or voice signals of an external device such as a camera or a camcorder, which are input through the external device interface 135, through the display 180 or the speaker 185, according to an external device image playback command received through the user input interface 150.

Moreover, the controller 170 may control the display 180 to display images, and may control the display 180 to display broadcast images input through the tuner 131, external input images input through the external device interface 135, images input through the network interface, or images stored in the memory 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communication interface 173 may perform wired or wireless communication with an external device. The wireless communication interface 173 may perform short-range communication with an external device. For this, the wireless communication interface 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication interface 173 may detect (or recognize) a wearable device capable of communication around the display device 100.

Furthermore, if the detected wearable device is a device authenticated to communicate with the display device 100, the controller 170 may transmit at least part of data processed in the display device 100 to the wearable device through the wireless communication interface 173. Therefore, a user of the wearable device may use the data processed by the display device 100 through the wearable device.

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 illustrated in FIG. 1 is just one embodiment of the present disclosure and thus, some of the components illustrated may be integrated, added, or omitted according to the specification of the actually implemented display device 100.

In other words, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing content input from the image processing device.

In this case, a method for operating a display device according to an embodiment of the present disclosure described below may be performed by one of the display device described with reference to FIG. 1, an image processing device such as the separated set-top box, and a content playback device including the display 180 and the speaker 185.

A remote control device according to an embodiment of the present disclosure will be described with reference to FIGS. 2 and 3.

Figure 2:
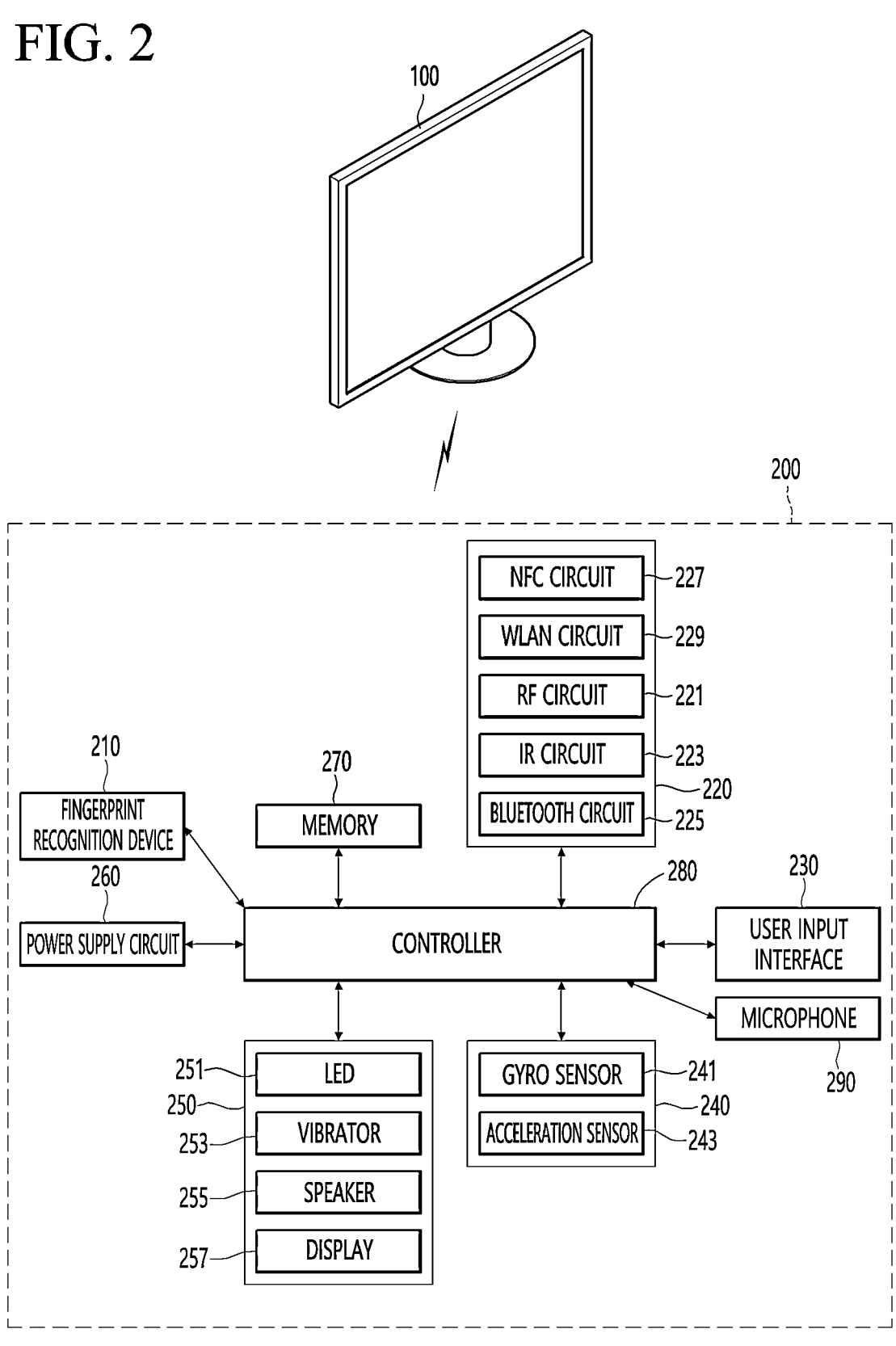
FIG. 2 is a block diagram illustrating a remote control device according to an embodiment of the present disclosure.
Figure 3:
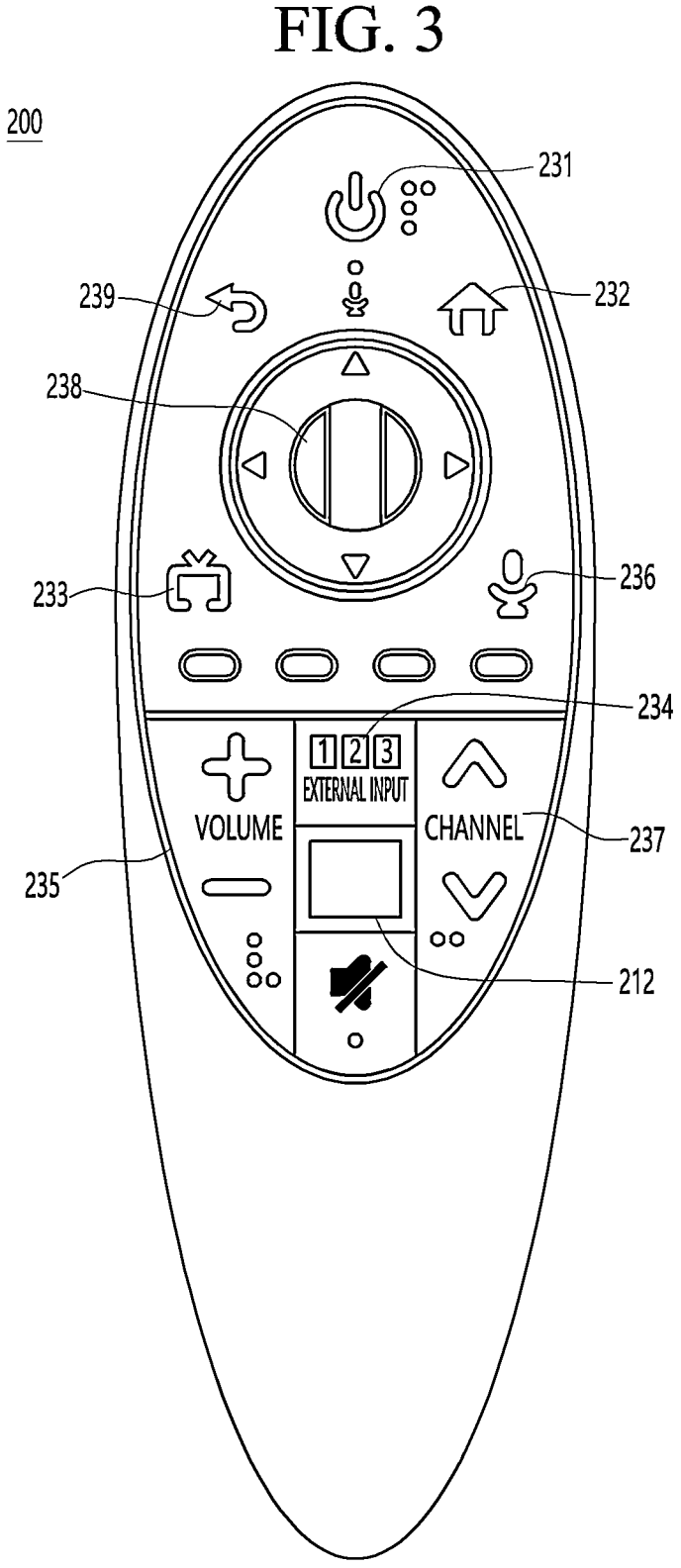
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition device 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 transmits/receives signals to/from an arbitrary any one of display devices according to the above-mentioned embodiments of the present disclosure.

The remote control device 200 may include a radio frequency (RF) circuit 221 capable of transmitting or receiving signals to or from the display device 100 according to an RF communication standard, and an IR circuit 223 capable of transmitting or receiving signals to or from the display device 100 according to an IR communication standard. In addition, the remote control device 200 may include a Bluetooth circuit 225 capable of transmitting or receiving signals to or from the display device 100 according to a Bluetooth communication standard. In addition, the remote control device 200 may include an NFC circuit 227 capable of transmitting or receiving signals to or from the display device 100 according to an NFC communication standard, and a wireless LAN (WLAN) circuit 229 capable of transmitting or receiving signals to or from the display device 100 according to a WLAN communication standard.

In addition, the remote control device 200 may transmit signals containing information on the movement of the remote control device 200 to the display device 100 through the wireless communication circuit 220.

Moreover, the remote control device 200 may receive signals transmitted from the display device 100 through the RF circuit 221 and if necessary, may transmit a command for power on/off, channel change, and volume change to the display device 100 through the IR circuit 223.

The user input interface 230 may be configured with a keypad, a button, a touch pad, or a touch screen. A user may operate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation.

The power button 231 may be a button for turning on/off the power of the display device 100.

The home button 232 may be a button for moving to the home screen of the display device 100.

The live button 233 may be a button for displaying live broadcast programs.

The external input button 234 may be a button for receiving an external input connected to the display device 100.

The volume control button 235 may be a button for controlling a volume output from the display device 100.

The voice recognition button 236 may be a button for receiving user's voice and recognizing the received voice.

The channel change button 237 may be a button for receiving broadcast signals of a specific broadcast channel.

The OK button 238 may be a button for selecting a specific function, and the back button 239 may be a button for returning to a previous screen.

FIG. 2 is described again.

If the user input interface 230 includes a touch screen, a user may touch a soft key of the touch screen to input a command relating to the display device 100 to the remote control device 200. In addition, the user input interface 230 may include various kinds of input interfaces operable by a user, for example, a scroll key and a jog key, and this embodiment does not limit the scope of the present disclosure.

The sensor 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display 180 of the display device 100.

The output interface 250 may output image or voice signals in response to the operation of the user input interface 230, or may output image or voice signals corresponding to signals transmitted from the display device 100.

A user may recognize whether the user input interface 230 is operated or the display device 100 is controlled through the output interface 250.

For example, the output interface 250 may include an LED 251 for flashing, a vibrator 253 for generating vibration, a speaker 255 for outputting sound, or a display 257 for outputting an image, if the user input interface 230 is manipulated or signals are transmitted/received to/from the display device 100 through the wireless communication part 225.

Additionally, the power supply circuit 260 supplies power to the remote control device 200 and if the remote control device 200 does not move for a predetermined time, stops the power supply, so that power waste may be reduced.

The power supply circuit 260 may resume the supply of power if a predetermined key provided at the remote control device 200 is operated.

The memory 270 may store various kinds of programs and application data required to control or operate the remote control device 200.

If the remote control device 200 transmits/receives signals wirelessly through the display device 100 and the RF circuit

221, the remote control device 200 and the display device 100 transmits/receives signals through a predetermined frequency band.

The controller 280 of the remote control device 200 may store, in the memory 270, information on a frequency band for transmitting/receiving signals to/from the display device 100 paired with the remote control device 200 and refer to it.

The controller 280 controls general matters relating to the control of the remote control device 200. The controller 280 may transmit a signal corresponding to a predetermined key operation of the user input interface 230 or a signal corresponding to the movement of the remote control device 200 sensed by the sensor 240 to the display device 100 through the wireless communication part 225.

In addition, the microphone 290 of the remote control device 200 may obtain voice.

A plurality of microphones 290 may be provided.

Figure 4:
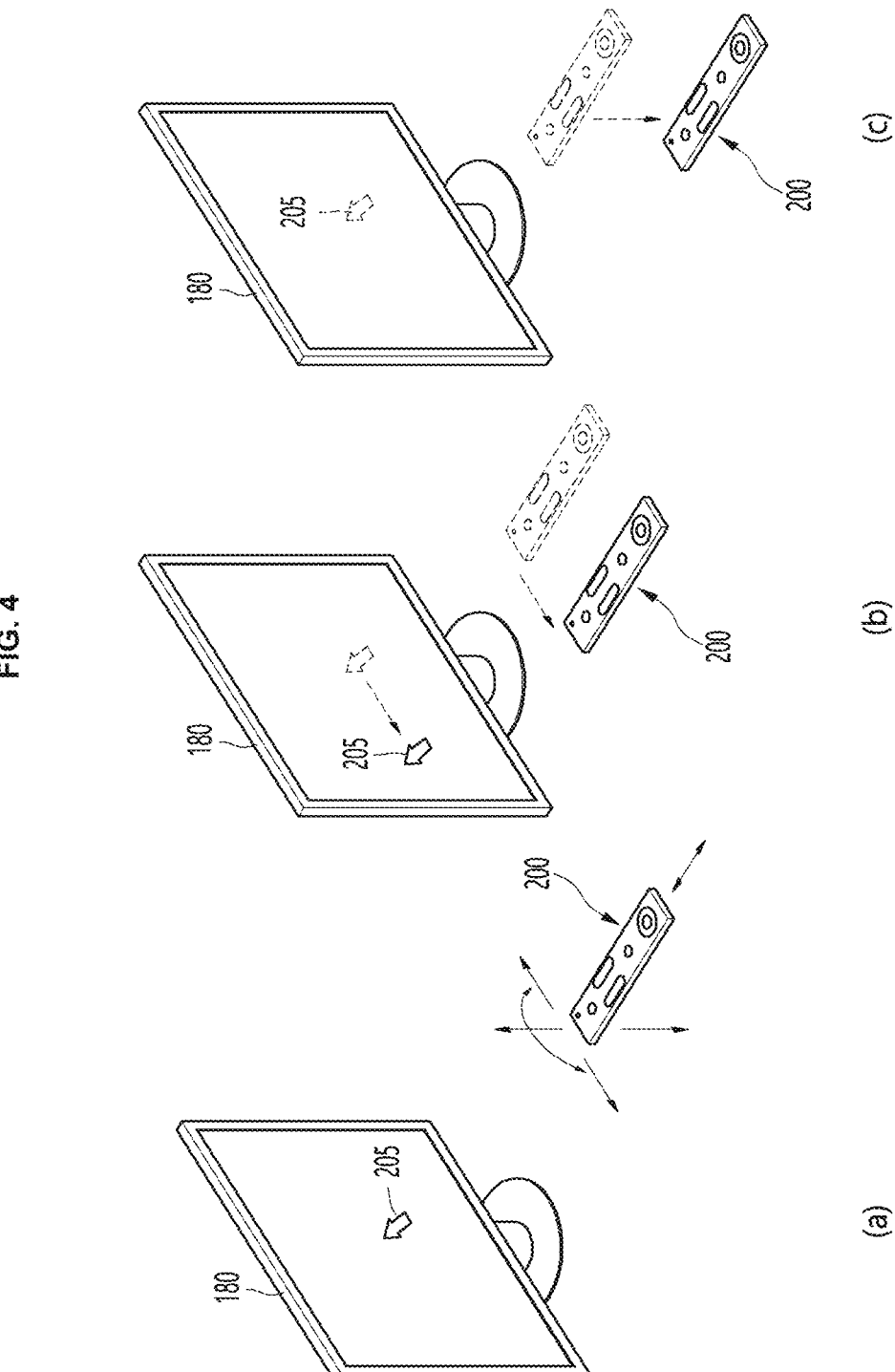
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display 180. Thus, a selected region in the display 180 corresponding to the pointer 205 may be zoomed in and displayed in an enlarged size.

On the other hand, if a user moves the remote control device 200 close to the display 180, a selection area in the display 180 corresponding to the pointer 205 may be zoomed out and displayed in a reduced size.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. In other words, if the remote control device 200 is moved away from or closer to the display 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

According to the display device and the method for driving the same according to an embodiment of the present disclosure, it is capable of recognizing an alarm signal generated from a peripheral device and registering an alarm setting in the display device.

According to the display device and the method for driving the same according to an embodiment of the present disclosure, it is capable of recognizing an alarm signal generated from a peripheral device and providing an alarm function to the user using the display device.

FIG. 5 is a block diagram illustrating a display device according to an embodiment of the present disclosure.

The display device 100 according to an embodiment of the present disclosure may include a controller 170, a display 180, a speaker 185, and a microphone 195.

The display device 100 according to an embodiment may include a display 180 that displays content. The controller 170 may display content on the display 180. For example, the display 180 may display at least one content among broadcast content including photos, movies, broadcast programs, or the like. The display 180 may display content through a web application in a networking environment. The display 180 may display user content.

User content may include at least one of content stored by the user, content created by the user, or content stored as an object by the user. User content may include at least one of photos, videos, schedule information, or alarm information.

The display device 100 according to an embodiment may include a speaker 185. The controller 170 may output an audio signal through the speaker 185. The speaker 185 may output an audio signal linked to the video signal displayed on the display 180.

The display device 100 according to an embodiment may include a microphone 195. The controller 170 may control the microphone 195. The microphone 195 may obtain an audio signal including voice or music. The obtained audio signal may be transmitted to the controller 170.

The display device 100 according to an embodiment may include a memory 140. The controller 170 may output an audio signal through the speaker 185 or store it in the memory 140. The controller 170 may store broadcast content or user content in the memory 140. The controller 170 may store the audio signal received from the microphone 195 in the memory 140.

FIG. 6 is a flowchart illustrating a method for driving a display device according to an embodiment of the present disclosure.

The display device 100 according to an embodiment may receive an audio signal (S601).

As an example, the display device 100 may receive an audio signal through the microphone 195. Audio signals received by the microphone 195 may include voice signals and music signals. Audio signals may be generated from peripheral devices placed around the display device 100. The audio signal may be generated from a device located around the microphone 195.

The controller 170 may determine whether the audio signal received from the microphone 195 is a voice signal or a music signal. The controller 170 may extract a music signal from the received audio signal. The controller 170 may distinguish the received audio signal into a voice signal and a music signal.

For example, the controller 170 may determine whether the received audio signal is a voice signal or a music signal by analyzing a spectrogram or the like. As is known, a spectrogram is a tool for visualizing and understanding sound or waves, and combines the characteristics of a waveform and a spectrum. A spectrogram for an audio signal may represent time on the x-axis, frequency on the y-axis, and amplitude on the z-axis. Through analysis of the spectrogram, it is possible to determine whether the received audio signal is a voice signal or a music signal.

Music signals have a definite note name, and due to their frequency characteristics, they appear to persist at a specific frequency. Voice signals do not maintain an exact frequency band, but appear to shift in pitch in a wavy manner.

Using these characteristics of the music signal and the voice signal, it is possible to distinguish whether the currently received audio signal is a music signal or a voice signal. Additionally, since there is a difference between the frequency band of the voice signal and the frequency band of the music signal, the voice signal and the music signal may be distinguished using these characteristics.

Since a specific method for distinguishing between a voice signal and a music signal among received audio signals is known in the technical field to which this disclosure pertains, a detailed description thereof will be omitted here.

The display device 100 according to an embodiment may determine whether the received audio signal is an alarm signal (S603).

The controller 170 of the display device 100 may determine whether the audio signal received from the microphone 195 is an alarm signal. The controller 170 may determine whether the audio signal received from the microphone 195 includes an alarm signal.

As an example, with reference to FIG. 7, a process in which the controller 170 recognizes whether an alarm signal is received in the display device 100 according to an embodiment of the present disclosure will be described.

To facilitate understanding, the description will be based on an example in which a display device 100 such as a TV receives an audio signal output from a mobile terminal such as a smartphone, and the controller 170 of the display device 100 determines whether a received audio signal includes an alarm signal.

Mobile terminals are a representative device through which users set alarms. The mobile terminal may output the corresponding alarm signal at the set alarm time. The mobile terminal may output music or broadcast content. The mobile terminal may also output user content.

A process in which the display device 100 receives an audio signal output from a mobile terminal and determines whether an alarm signal is received will be described.

First, the display device 100 may receive an audio signal (S701).

The display device 100 may receive audio signals generated from peripheral devices such as mobile terminals through the microphone 195.

For example, by setting the microphone 195 to be driven in an always turned on state, it may be driven so that the microphone 195 may continue to receive audio signals generated in the surroundings regardless of whether the display device 100 is in an operating state or turned off state.

The controller 170 may extract signals of some sections from the received audio signal. For example, the controller 170 may extract a music signal from a received audio signal and obtain a partial section of the extracted music signal. Some sections of the music signal may be divided into certain time intervals, such as 10 or 20 seconds.

The display device 100 may compare the similarity between the received audio signal and the alarm signal stored in the database (S703).

According to an embodiment of the present disclosure, in the memory 140 of the display device 100, alarm signals that may be selected as alarm settings for the user in the mobile terminal may be converted into a database and stored in advance. Music signals that may be included in the mobile terminal and that be selected as alarm signals by the user may be converted into a database and stored in advance in the display device 100.

The controller 170 may compare the similarity between the music signal received by the microphone 195 and the alarm signal stored in the database. The controller 170 may extract a portion of the music signal received from the microphone 195 and measure the similarity with the music signal to be compared and stored as an alarm signal in the database.

For example, the similarity between a received music signal and a music signal to be compared may be measured by a cross correlation operation. As known in the art to which this disclosure pertains, a cross correlation operation may be used to measure the correlation between a received music signal and a music signal to be compared.

By shifting some sections of the extracted music signal and measuring how similar they are to the music signal to be compared, some sections of the music signal received from the microphone 195 may be used to measure the similarity with the music signals to be compared stored as alarm signals in the database.

Since a specific method for measuring the similarity between a section of an extracted music signal and a music signal to be compared is known in the technical field to which this disclosure pertains, a detailed description thereof will be omitted here.

Next, the display device 100 may record the received audio signal and the time of occurrence (S705).

The controller 170 of the display device 100 may check whether an alarm signal similar to the music signal received from the microphone 195 is stored in the database by measuring similarity with alarm signals stored in the database.

If there is an alarm signal whose similarity measurement value with the music signal received from the microphone 195 is greater than a set threshold among the alarm signals stored in the database, the controller 170 may record the received audio signal and the time of occurrence in memory 140. The controller 170 may record the recognized alarm signal and the time of occurrence corresponding to the received audio signal in the memory 140.

If, among the alarm signals stored in the database, there is no alarm signal whose similarity measurement value with the music signal received from the microphone 195 is greater than the set threshold, the controller 170 may determine that the received audio signal is not an alarm signal.

Next, the display device 100 may register an alarm setting when the received audio signal is generated at a certain cycle (S707).

The controller 170 may perform a similarity comparison between the audio signal continuously received through the microphone 195 and the alarm signals stored in the database. The controller 170 may extract a music signal from audio signals continuously received through the microphone 195, compare the extracted music signal with alarm signals stored in a database, and measure similarity.

Through this similarity measurement process, the controller 170 of the display device 100 may register an alarm setting in the memory 140 when the received audio signal is generated at a certain cycle.

If the controller 170 determines that the extracted music signal is received at a certain time or at a certain cycle, it may register the extracted music signal as an alarm signal.

For example, if the controller 170 recognizes that the same audio signal or the same music signal is generated at the same time every day, the controller 170 may determine that the audio signal or the music signal is an alarm signal and register an alarm setting.

In addition, if the controller 170 recognizes that the same audio signal or the same music signal occurs on the same day and at the same time every week, the controller 170 may determine that the audio signal or the music signal is an alarm signal and register the alarm settings.

The display device 100 may perform a procedure to check whether the user has set an alarm before registering the alarm setting. The display device 100 may check whether an alarm is set to the user using an audio signal or a video signal.

As another example, with reference to FIG. 8, a process in which the controller 170 recognizes whether an alarm signal is received in the display device 100 according to an embodiment of the present disclosure will be described.

The embodiment described with reference to FIG. 7 is described based on the case where alarm signals used in a mobile terminal are previously stored in the display device 100. An embodiment to be described below with reference to FIG. 8 will be described based on a case where alarm signals used in peripheral devices such as mobile terminals are not previously stored in the display device 100.

First, the display device 100 may receive an audio signal (S801).

The display device 100 may receive audio signals generated from peripheral devices such as mobile terminals through the microphone 195.

For example, by setting the microphone 195 to be driven in an always turned on state, the display device may be driven so that the microphone 195 continues to receive audio signals generated in the surroundings regardless of whether the display device 100 is in an operating state or turned off state.

The display device 100 may store a music signal among the received audio signals in a database (S803).

The controller 170 of the display device 100 may extract a signal of some section from the received audio signal. For example, the controller 170 may extract a music signal from a received audio signal and obtain a partial section of the extracted music signal. Some sections of the music signal may be divided into certain time intervals, such as 10 or 20 seconds.

The controller 170 may extract music signals from the received audio signals, store the received music signals in the memory 140, and converted into a database.

The display device 100 may compare the similarity between the received audio signal and the music signal stored in the database (S805).

The controller 170 may measure the similarity between the music signal extracted from the received audio signal and the music signal stored in the database. The controller 170 may compare the similarity between the music signal received by the microphone 195 and the music signal stored in the database. The controller 170 may extract some sections of the music signal received from the microphone 195 and measure the similarity with the music signal to be compared and stored as a music signal in the database.

For example, the similarity between a received music signal and a music signal to be compared may be measured by a cross correlation operation. As known in the art to which this disclosure pertains, a cross correlation operation may be used to measure the correlation between a received music signal and a music signal to be compared.

By shifting some sections of the extracted music signal and measuring how similar they are to the music signal to be compared, some sections of the music signal received from the microphone 195 are used to measure similarity with the music signals to be compared and stored as music signals in the database.

Since a specific method for measuring the similarity between some sections of an extracted music signal and a music signal to be compared is known in the technical field to which this disclosure pertains, a detailed description thereof will be omitted here.

Next, the display device 100 may record the received audio signal and the time of occurrence (S807).

The controller 170 of the display device may record the received audio signal and the time of occurrence in the memory 140 by converting it into a database. The controller 170 may record the music signal received from the microphone 195 and the time of occurrence.

The controller 170 of the display device 100 may check whether a music signal to be compared similar to the music signal received from the microphone 195 is stored in the database by measuring similarity with music signals stored in the database.

If the controller 170 determines that the received music signal is a new signal that is not included in the music signals to be compared stored in the database, the controller 170 may additionally store the received music signal as a music signal to be compared in the database.

If there is a music signal whose similarity measurement value with the music signal received from the microphone 195 is greater than a set threshold among the music signals to be compared stored in the database, the controller 170 may record received audio signal and the time of occurrence in the memory 140. The controller 170 may record the music signal to be compared and the time of occurrence recognized corresponding to the received audio signal in the memory 140.

Next, the display device 100 may register an alarm setting when the received audio signal is generated at a certain cycle (S809).

The controller 170 may perform a similarity comparison between the audio signal continuously received through the microphone 195 and the music signals to be compared stored in the database. The controller 170 may extract a music signal from the audio signal continuously received through the microphone 195, compare the extracted music signal with music signals to be compared stored in a database, and measure the similarity.

Through this similarity measurement process, the controller 170 of the display device 100 may register an alarm setting in the memory 140 when the received audio signal or music signal is generated at a certain cycle.

The controller 170 may register the extracted music signal as an alarm signal in the memory 140 when at least one of a similarity comparison value with a music signal stored in the database, an occurrence time coincidence comparison value, or a reception cycle comparison value, for the extracted music signal satisfies a set standard.

For example, if the controller 170 recognizes that the same audio signal or the same music signal is generated at the same time every day, the controller 170 may determine that the audio signal or the music signal is an alarm signal and register an alarm setting.

In addition, if the controller 170 recognizes that the same audio signal or the same music signal occurs on the same day and at the same time every week, the controller 170 may determine that the audio signal or the music signal is an alarm signal and register the alarm settings.

The display device 100 may perform a procedure to check whether the user has set an alarm before registering the alarm setting. The display device 100 may check whether an alarm is set to the user using an audio signal or a video signal.

If the audio signal for which the alarm has been set is not received again within a certain period of time, the display device 100 may release the corresponding alarm setting in the database (S811).

If the alarm-set audio signal or music signal registered in the database is not received again within a set certain period of time, the controller 170 may assume that the user does not use the alarm setting and release or delete the alarm setting.

According to an embodiment of the present disclosure, as described with reference to FIGS. 7 and 8, the controller 170 of the display device 100 may determine whether the audio signal or music signal received from the microphone 195 is an alarm signal.

Again, referring to FIG. 6, the display device 100 according to the embodiment may output a signal corresponding to the alarm signal (S605).

The controller 170 of the display device 100 may output a signal corresponding to the alarm signal. The controller 170 may output a signal corresponding to the alarm signal through the speaker 185. The controller 170 may output a signal corresponding to the alarm signal through the display 180.

According to an embodiment of the present disclosure, when a user sets an alarm on a mobile terminal such as a smartphone and an alarm signal is generated from the mobile terminal at the alarm-set time, the controller 170 of the display device 100 such as a TV may recognize the occurrence of the corresponding alarm signal and the controller 170 may output a control signal corresponding to the alarm signal.

The controller 170 may output an audio signal identical to the alarm signal generated in the mobile terminal through the speaker 185. The controller 170 may output a louder audio signal than the alarm signal generated from the mobile terminal through the speaker 185. The controller 170 may emphasize the alarm effect by outputting an audio signal in which the low tone of the alarm signal generated from the mobile terminal is emphasized through the speaker 185. The controller 170 may recognize the occurrence of an alarm signal and provide an alarm function using the display 180.

According to an embodiment of the present disclosure, when the display device 100 determines that an alarm signal has occurred for the audio signal received from the microphone 195 and registers an alarm setting, a connection method between the user device and the display device 100 may be provided to the user.

For example, as illustrated in FIGS. 9 and 10, the display device 100 may display an image 901 of a QR code or barcode on the display 180 and provide connection with a user device. The user may simply and conveniently connect the user device to the display device 100 with respect to the image 901 of the QR code or barcode displayed on the display 180 through the photographing or scanning function of the mobile terminal. For example, the display device 100 may recognize a QR code or barcode for a mobile terminal and provide a related link so that an alarm setting application may be installed on the mobile terminal.

According to an embodiment of the present disclosure, when the display device 100 and the mobile terminal are connected, the display device 100 may obtain user alarm setting information registered in the mobile terminal. The controller 170 of the display device 100 may store user alarm setting information registered in the mobile terminal by converting it into a database in the memory 140.

The display device 100 may use the speaker 185 to provide more diverse audio signals than a mobile terminal. The display device 100 may expand its alarm functions in various ways by utilizing the display 180, which has a larger screen than a mobile terminal.

When the controller 170 recognizes the occurrence of an alarm signal from the audio signal received from the microphone 195, the controller may provide an alarm signal that is pleasant to listen to by playing music that the user has often listened to.

When the controller 170 recognizes the occurrence of an alarm signal from the audio signal received from the microphone 195, the controller may guide the user by recommending a video or broadcast program that the user can watch today based on the videos the user has frequently watched. For example, the display device 100 may play an OST related to a broadcast program that a user frequently watches through the speaker 185 and display a related image on the display 180.

When the controller 170 recognizes the occurrence of an alarm signal from the audio signal received from the microphone 195, the controller 170 may run a web application frequently used by the user and play a recommended video of the web application.

When the controller 170 recognizes the occurrence of an alarm signal from the audio signal received from the microphone 195, the controller 170 may obtain user schedule information and display today's schedule on the display 180. The controller 170 may output user schedule information to the speaker 185.

When an alarm signal is recognized, the controller 170 may generate a control signal set to correspond to the recognized alarm signal and drive at least one of the speaker 185 or the display 180.

According to an embodiment of the present disclosure, when the display device 100 recognizes the occurrence of an alarm signal from the audio signal received from the microphone 195, the display device uses the speaker 185 or the display 180 to draw the user's attention, and thus output alarm signals in a variety of ways.

As illustrated in FIG. 11, the display device 100 may display a guidance screen 1101 for an Internet of Things (IOT) device connected to the display device 100 and operate the Internet of Things device set corresponding to an alarm signal.

For example, when an alarm signal is recognized, the controller 170 may transmit a control signal set corresponding to the recognized alarm signal to a peripheral device. The controller 170 of the display device 100 may control the operation of lights or curtains connected to the display device 100.

If the controller 170 determines that the audio signal received from the microphone 195 is an alarm signal, the controller may turn on the living room lights connected to the Internet of Things and open the living room curtains by generating a control signal set corresponding to the alarm signal.

According to an embodiment of the present disclosure, the display device 100 may register alarm sounds from peripheral devices that may be connected to the display device 100 and generate a control signal corresponding to the alarm sound.

For example, the display device 100 may register a button operation sound of an air purifier, which is one of the peripheral devices, or an alarm sound according to the state, in the memory 140 of the display device 100.

As illustrated in FIG. 12, the controller 170 of the display device 100 may display a guidance pop-up image 1201 on the display 180 when the controller 170 of the display device 100 recognizes the operation sound of the air purifier or an alarm sound according to the state from the audio signal received by the microphone 195. The display device 100 may guide the user of the status of the air purifier to the user, receive a control request for the air purifier from the user, and transmit the corresponding control signal to the air purifier connected to the Internet of Things.

For example, the display device 100 may register a door lock button operation sound or a door lock release sound in the memory 140 of the display device 100.

As illustrated in FIG. 13, when the controller 170 of the display device 100 recognizes a door lock button operation sound or an alarm sound due to door lock release from the audio signal received by the microphone 195, a guidance pop-up image 1301 may be displayed on the display 180. The display device 100 may provide the status of the door lock and a visitor video to the user. The display device 100 may recognize a door lock operation, recognize a visitor using a door lock camera connected to the Internet of Things, and display the information on the display 180. The display device 100 may recognize the visitor's object information, distinguish each family member or visitor, and display different menus or screens on the display 180.

According to an embodiment of the present disclosure, setting of a trigger signal is added when setting an alarm signal in a peripheral device, and various and convenient application examples may be provided through recognition of the alarm signal and trigger signal in the display device 100.

For example, as illustrated in FIG. 14, when setting an alarm in a mobile terminal, a menu screen 1401 may be displayed inquiring whether to use a 'trigger signal'.

The menu screen 1401 may include an item 1410 for inquiring about whether to use a trigger signal, an item 1411 for selecting use of a trigger signal, or an item 1413 for selecting not to use a trigger signal.

The configuration items of the menu screen 1401 may be modified in various ways. For example, the menu screen 1401 displays only the inquiry item 1410 on whether a trigger signal is used, and the display method of the item is changed to display differently according to whether the user selects the item, thereby it may also be implemented to check the setting status of whether or not a trigger signal is used.

The choice of whether to use a trigger signal may be implemented to uniformly apply to all registered alarm settings. Additionally, whether to use a trigger signal may be implemented to be individually selected for each alarm setting.

The trigger signal may be set to the same signal in all registered alarm settings. Additionally, the trigger signal may be set individually for each alarm setting.

An alarm set to use a trigger signal may include an alarm signal for the alarm and a trigger signal for the alarm.

The display device 100 may determine whether an alarm signal is received from the audio signal received from the microphone 195. The display device 100 may check whether the corresponding alarm includes a trigger signal from the alarm setting database stored in the memory 140.

If it is determined that an audio signal representing an alarm set to use a trigger signal has been received, the display device 100 may perform a set operation corresponding to the trigger signal in the process of outputting the alarm signal.

The controller 170 of the display device 100 may recognize a trigger signal added to the alarm signal among the received audio signals and output a signal corresponding to the trigger signal. The controller 170 may recognize a trigger signal, generate a control signal corresponding to the trigger signal, and drive at least one of the speaker 175 or the display 180. Additionally, the controller 170 of the display device 100 may recognize a trigger signal, generate a control signal corresponding to the trigger signal, and transmit it to a peripheral device.

According to an embodiment of the present disclosure, the trigger signal may be connected to and added to the end portion of the alarm signal. The trigger signal may include an audio signal of a music signal or a voice signal. As an example, the trigger signal may include an audio signal such as "Hi LG" or "Hi Bixby."

The display device 100 may determine whether an alarm signal is received from the audio signal received from the microphone 195 and check whether the corresponding alarm includes a trigger signal from a stored alarm setting database.

As an example, to aid understanding, the description will be based on a case where the mobile terminal has a first alarm setting in which use of a trigger signal is not selected and a second alarm setting in which use of a trigger signal is selected.

The first alarm setting is an alarm that includes a first alarm signal and does not select to use a trigger signal.

The mobile terminal outputs a first alarm signal when the time corresponding to the first alarm setting arrives. The display device 100 may receive a first alarm signal from the microphone 195 and determine that a first alarm corresponding to the first alarm setting is being generated. The display device 100 may output a signal corresponding to the first alarm setting.

For example, the display device 100 may output a signal corresponding to the first alarm to the speaker 185 or the display 180 according to the content set in the first alarm. The display device 100 may output an audio signal corresponding to the first alarm setting through the speaker 185. The display device 100 may display video content corresponding to the first alarm setting on the display 180. The display device 100 may provide a control signal corresponding to the first alarm setting to peripheral devices such as lighting devices or curtains.

The second alarm setting is an alarm that includes a second alarm signal and selects to use a trigger signal.

The mobile terminal outputs a second alarm signal when the time corresponding to the second alarm setting arrives. The display device 100 may receive a second alarm signal from the microphone 195 and determine that a second alarm corresponding to the second alarm setting is being generated. The display device 100 may output a signal corresponding to the second alarm setting.

The display device 100 may determine the properties of the trigger signal in the second alarm setting and process an operation corresponding to the second alarm setting.

For example, the second alarm setting may be set so that the display device 100 does not output an alarm signal even after recognizing the occurrence of the second alarm until a trigger signal is received.

In this case, when the second alarm setting is executed in the mobile terminal, a second alarm signal according to the second alarm setting may be output from the mobile terminal, and a trigger signal may be output following the second alarm signal.

The display device 100 may receive a second alarm signal from the microphone 195, recognize the occurrence of the second alarm, and wait without outputting an alarm signal until it receives a trigger signal from the microphone 195.

The display device 100 may receive a trigger signal from the microphone 195 and process an operation corresponding to the second alarm setting.

For example, the display device 100 may output a signal corresponding to the second alarm to the speaker 185 or the display 180 according to the content set in the second alarm. The display device 100 may output an audio signal corresponding to the second alarm setting through the speaker 185. The display device 100 may display video content corresponding to the second alarm setting on the display 180. The display device 100 may provide a control signal corresponding to the second alarm setting to peripheral devices such as lighting devices or curtains.

According to an embodiment of the present disclosure, when the user operates the mobile terminal to stop generation of the second alarm before the trigger signal is output in response to the second alarm signal output from the mobile terminal, the display device 100 does not output an alarm signal according to the second alarm setting. However, if the user does not stop generation of the second alarm even if a trigger signal is output from the mobile terminal, the display device 100 may process an operation corresponding to the second alarm setting.

For example, when a user sets a wake-up alarm on a mobile terminal and the user stops generating the alarm after listening to a music signal output from the mobile terminal, the display device 100 does not output an alarm signal according to the wake-up alarm setting. However, if the user does not stop the alarm generation even when a trigger signal such as "Hi LG" is output from the mobile terminal, the display device 100 may process the operation according to the wake-up alarm setting. For example, the display device 100 may output a loud music sound through the speaker 185, turn on the lights by transmitting a control signal to a lighting device that is a peripheral device connected to the Internet of Things, transmit a control signal to a curtain which is a peripheral device connected to the Internet of Things and open the curtain.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage devices.

The display device described above is not limited to the configuration and method of the above-described embodiments, and the embodiments may be configured by selectively combining all or part of each embodiment so that various modifications may be made.

The invention claimed is:

1. A display device comprising:
a microphone receiving an audio signal;
a controller determining whether the audio signal is an alarm signal; and
a speaker outputting a signal corresponding to the alarm signal,
wherein the controller:
extracts a music signal from the received audio signal, and
registers the extracted music signal as an alarm signal based on the extracted music signal being received at a predetermined time or at a predetermined period.

2. The display device of claim 1, further comprising:
a display outputting a signal corresponding to the alarm signal.

3. The display device of claim 2,
wherein the controller recognizes a trigger signal added to an alarm signal among the audio signals and outputs a signal corresponding to the trigger signal.

4. The display device of claim 3,
wherein the trigger signal is connected to and added to an end portion of the alarm signal.

5. The display device of claim 3,
wherein the controller recognizes the trigger signal and generates a control signal corresponding to the trigger signal to drive at least one of the speaker or the display.

6. The display device of claim 3,
wherein the controller recognizes the trigger signal, generates a control signal corresponding to the trigger signal, and transmits the control signal to a peripheral device.

7. The display device of claim 2,
wherein when an alarm signal is recognized, the controller displays a QR code or barcode on the display and provides connection to a user device.

8. The display device of claim 2,
wherein when an alarm signal is recognized, the controller generates a control signal set corresponding to the recognized alarm signal and drives at least one of the speaker or the display.

9. The display device of claim 1,
wherein the audio signal received by the microphone includes a voice signal and a music signal, and
wherein the controller determines whether the received music signal is an alarm signal.

10. The display device of claim 1,
wherein the controller:
registers the extracted music signal as an alarm signal, for the extracted music signal, based on at least one of a similarity comparison value with a music signal stored in a database, a reception time coincidence comparison value, or a reception period comparison value satisfying a preset criterion.

11. The display device of claim 10,
wherein a music signal that is not received again until a certain period of time has elapsed among the music signals registered as the alarm signals is released from the registered alarm signal.

12. The display device of claim 1,
wherein the audio signal is generated from a device located around the microphone.

13. The display device of claim 1,
wherein the controller outputs an audio signal or a video signal to inquire whether to register an alarm based on an alarm signal being recognized.

14. The display device of claim 1,
wherein when an alarm signal is recognized, the controller transmits a control signal set corresponding to the recognized alarm signal to a peripheral device.

* * * * *